US012577977B2

(12) United States Patent
Gurvich et al.

(10) Patent No.: US 12,577,977 B2
(45) Date of Patent: Mar. 17, 2026

(54) INTEGRATED COMPOSITE DRIVE SHAFTS

(71) Applicant: Goodrich Corporation, Charlotte, NC (US)

(72) Inventors: Mark R. Gurvich, Middletown, CT (US); Michael J. King, Sauquoit, NY (US); Brayton Reed, New York Mills, NY (US); Joyel M. Schaefer, Earlville, NY (US)

(73) Assignee: Goodrich Corporation, Charlotte, NC (US)

( * ) Notice: Subject to any disclaimer, the term of this patent is extended or adjusted under 35 U.S.C. 154(b) by 373 days.

(21) Appl. No.: 18/127,584

(22) Filed: Mar. 28, 2023

(65) Prior Publication Data

US 2024/0328453 A1     Oct. 3, 2024

(51) Int. Cl.
*F16C 3/02* (2006.01)

(52) U.S. Cl.
CPC .......... *F16C 3/026* (2013.01); *F16C 2326/06* (2013.01); *Y10T 428/1393* (2015.01)

(58) Field of Classification Search
CPC . F16C 3/026; F16C 2326/06; Y10T 428/1393
USPC ........................................................ 464/181
See application file for complete search history.

(56) References Cited

U.S. PATENT DOCUMENTS

| | | | |
|---|---|---|---|
| 4,131,701 A | 12/1978 | Vanauken | |
| 4,173,128 A | 11/1979 | Corvelli | |
| 11,260,605 B2 | 3/2022 | Iyer et al. | |
| 11,273,610 B2 | 3/2022 | Reed et al. | |
| 12,123,460 B2 * | 10/2024 | Sugiyama | B29C 70/86 |
| 2019/0128334 A1 | 5/2019 | Pollitt | |
| 2020/0298505 A1 | 9/2020 | Reed et al. | |
| 2022/0143933 A1 | 5/2022 | Iyer et al. | |
| 2023/0175547 A1 | 6/2023 | Valembois | |
| 2024/0369096 A1 * | 11/2024 | Gurvich | F16C 3/026 |

FOREIGN PATENT DOCUMENTS

| | | |
|---|---|---|
| FR | 2564538 A1 | 11/1985 |
| FR | 3109746 A1 | 11/2021 |

OTHER PUBLICATIONS

Extended European Search Report for European Patent No. 24167355. 7, Dated Aug. 7, 2024, 10 Pages.

* cited by examiner

*Primary Examiner* — Greg Binda
(74) *Attorney, Agent, or Firm* — Kinney & Lange, P.A.

(57) ABSTRACT

A composite shaft includes a plurality of composite elements arranged about an axis to form a hollow shaft with at least one undulation. The plurality of composite elements incudes a first group of the composite elements arranged about the axis offset by an angle +α and a second group of the composite elements arranged about the axis offset by an angle −α to form a web with the first group of composite elements. The first and second groups of the plurality of composite elements are configured to cooperate with one another to allow the hollow shaft to be flexible under axial load and stiff under rotational load.

19 Claims, 18 Drawing Sheets

INTEGRATED COMPOSITE DRIVE SHAFTS

TECHNICAL FIELD

The present disclosure relates to drive shafts, and more particularly to integrated, composite drive shafts.

BACKGROUND

Among other structural requirements, drive shafts have to provide two seemingly conflicting structural responses, namely, to be stiff and strong under torque, but also to be flexible under axial and bending deformations. Such flexibility is needed to compensate for inevitable lateral and axial movements of shafts during service and/or to take into account potential imperfections of shaft installations. Current methods to resolve this dilemma are usually resolved by using metallic flexible couplings and/or diaphragms connected to opposite ends of a hollow cylindrical shaft with constant cross-section along its longitudinal axis. Thus, the metallic couplings provide the flexibility, and the cylindrical shaft provides the torsional load transfer. While cylindrical shaft bodies can be either metallic or composite, the couplings are predominantly metallic. Therefore, such conventional drive shafts can be relatively expensive due to requirements of high-precision fabrication and high-quality control requirements of metallic couplings. In addition to cost and labor, the metallic coupling can significantly contribute to overall weight of integrated coupling and shaft body systems.

The conventional techniques have been considered satisfactory for their intended purpose. However, there is an ever present need for improved systems and methods for flexible composite drive shafts and making the same. This disclosure provides a solution of integrated design of flexible composite drive shafts and method of making for this need.

SUMMARY

In accordance with at least one aspect of this disclosure, a composite shaft includes a plurality of composite elements arranged about an axis to form a hollow shaft. The plurality of composite elements incudes a first group of the composite elements arranged about the axis offset by an angle $+\alpha$ and a second group of the composite elements arranged about the axis offset by an angle $-\alpha$ to form a web with the first group of composite elements. The first and second groups of the plurality of composite elements are configured to cooperate with one another to allow the hollow shaft to be flexible under bending and/or axial load and stiff under rotational load. In certain embodiments, the angle $\alpha$ can be between about 30° and about 60°. In certain embodiments, the angle $\alpha$ can be between about 35° and about 55°. The composite shaft can include one or more undulations extending radially outward from the shaft. In embodiments, the undulations include a plurality of axisymmetric ring-like undulations distributed along the shaft length. The plurality of undulations can be distributed either uniformly or non-uniformly along the shaft length.

In embodiments, the plurality of composite elements can include a plurality of individual composite elements oriented along respective axes of the individual composite elements. In certain embodiments, the individual composite elements can include unidirectional oriented fibers in a polymeric matrix to form a fiber-reinforced polymer-matrix composite. In the embodiments, the composite material can include one or more of a polymeric matrix (e.g., a thermoset, a thermoplastic) and reinforcing fibers including any of carbon, glass and/or organic (e.g., Kevlar) fibers.

In embodiments, the first group of composite elements can include a first plurality of individual composite elements arranged in a first spiral direction along the axis of the shaft (e.g., clockwise as viewed from one axial end), and the second group of composite elements can include a second plurality of individual composite elements arranged in a second spiral direction along the axis of the shaft, wherein the second spiral direction is symmetric to the first spiral direction relative to the shaft axis (e.g., counter-clockwise as viewed from the same axial end).

In certain embodiments, a plurality of plies of the first plurality of composite elements can be overlaid on top of a plurality of plies of the second plurality of individual composite elements. In certain embodiments, the plies of the first plurality of composite elements can be interleaved with the plies of the second plurality of individual composite elements (e.g., alternating layer by layer). In certain embodiments, the plies of the first plurality of individual composite elements can be interleaved with the plies of the second plurality of individual composite elements, and one or more plies of a reinforcing pad having a length less than an axial length of the shaft, can be interleaved between the plies of the first plurality of individual composite elements and the plies of the second plurality of individual composite elements. In certain such embodiments, the plies of the reinforcing pad can be interleaved between each ply, or can be interleaved between plies at varying intervals, e.g., every two layers).

In embodiments, each individual composite element of the first plurality of individual composite elements can be circumferentially spaced from one another about the axis, and each individual composite element of the second plurality of individual composite elements can be circumferentially spaced from one another about the axis such that a gap is formed between each of individual composite element of the first plurality of individual composite elements and a gap is formed between each of individual composite element of the second plurality of individual composite elements. In certain such embodiments, a density of the plurality of composite elements can be constant along the axis, where a density of the composite elements can refer to a gap between each of the plurality of composite elements. In embodiments, the plurality of composite elements can have a constant density along the shaft in an axial direction such that a respective gap formed between each of individual composite element of the first plurality of individual composite elements and between each of individual composite element of the second plurality of individual composite elements has a constant area along the axial length of the shaft.

In certain embodiments, the plurality of composite elements can have a variable density along the shaft in an axial direction such that a respective gap formed between each of individual composite element of the first plurality of individual composite elements and between each of individual composite element of the second plurality of individual composite elements has a differing area along the axial length of the shaft. In certain such embodiments, an element count along the shaft in the circumferential direction may remain the same, while some portions of the shaft can exhibit a tighter spiral in the axial direction than others, such that the gap between elements varies along the shaft in the axial direction. In certain embodiments, a density of the composite elements can refer to an element count of the individual composite elements on the shaft in the circumferential direction, where the element count remains constant along the shaft, regardless of whether the gap size remains the same or varies.

In certain embodiments, the plurality of composite elements can include a third group of composite elements arranged axially along the axis and circumferentially spaced apart from one another about the axis (e.g., axial strands). The third group of composite elements can be arranged such that they intersect the first group of composite elements and the second group of composite elements at an intersection between the first group of composite elements and the second group of composite elements. In certain embodiments, the third group of composite elements can be arranged generally circumferentially (e.g., circumferentially or almost circumferentially) about the axis axially spaced apart from one another along the axis (e.g., hoops). In embodiments, the third group of composite elements can include a third plurality of individual composite elements axially or circumferentially spaced apart from one another along or about the axis at regular, constant intervals or variable intervals. In certain embodiments, the third plurality of individual composite elements can be positioned or concentrated at the axial ends of the shaft.

In certain embodiments, the plurality of composite elements can include a third group of composite elements arranged axially along the axis and circumferentially spaced apart from one another about the axis and a fourth group of composite elements arranged circumferentially about the axis and axially spaced apart from one another along the axis. In such embodiments, each of the first, second, third, and fourth groups of composite elements can intersect at a common point.

In certain embodiments, the respective gap formed between each of individual composite element of the first plurality of individual composite elements and between each of individual composite element of the second plurality of individual composite elements can be smaller on the between the one or more undulating portions than the respective gap formed between each of individual composite element of the first plurality of individual composite elements and between each of individual composite element of the second plurality of individual composite elements on the undulating portions of the shaft such that a density of the plurality of composite elements is greater on the portions of the shaft between the one or more undulating portions than on the plurality of undulating portions. In certain such embodiments, the element count on the undulating portions and the portions between the undulating portions can remain the same.

In certain embodiments, the hoops can be axially spaced apart from one another along the axis and positioned on the portions between the undulating portions. In certain embodiments, the hoops can be positioned on the undulating portions. In certain embodiments, the hoops can be positioned on both the undulating portions and between the undulating portions. In embodiments, the hoops can be placed at regular intervals or varying intervals. In certain embodiments, more hoops can be included on the portions between the undulating portions than on the undulating portions.

In certain embodiments, an axial cross-sectional profile of the hollow shaft can be constant along an axial length of the shaft, or wherein an axial cross-sectional profile of the hollow shaft is convex along an axial length of the hollow shaft, or an axial cross-sectional profile of the hollow shaft is concave along an axial length of the hollow shaft. In certain embodiments, the hollow shaft can have a variable asymmetric tubular profile along the axis such that the variable asymmetric cylindrical profile when viewed perpendicular to the axis is convex or concave. In certain such embodiments, an inner diameter (e.g., as defined herein) of the hollow shaft can vary along the axis.

In certain embodiments, the undulating portions can be included along an entire axial length of the shaft. In certain embodiments, the undulating portions can be positioned adjacent one another so that one undulating portion connects to the adjacent undulation portion with no flat or narrow portions in between. In certain embodiments, the undulating portions can be concentrated at the axial ends of the hollow shaft and a flat portion can be defined between the undulating portions. In certain embodiments, the undulating portions can be concentrated at a center of the shaft such that the axial ends of the shaft are free of undulating portions. The undulating portions can be axi-symmetric. In embodiments, the undulating portions can have varying geometries and/or sizes from one another. In embodiments, the undulating portions can be disposed along the shaft at regular or variable intervals.

In accordance with at least one aspect of this disclosure, a method of making a composite shaft can include forming a mandrel to have a one or more undulating portions along an axis of the mandrel, overlaying a composite web onto an external surface of the mandrel, hardening the composite web on the mandrel, and removing the mandrel from within the composite web to form a hollow shaft.

In embodiments, overlaying the composite web onto the external surface of the mandrel can include placing a first plurality of individual composite elements in a first spiral orientation along the axis of the mandrel in a first direction, and placing a second plurality of individual composite elements in a second spiral orientation along the axis of the mandrel in a second direction symmetrically-opposite from the first direction using automated fiber placement to form any one of the hollow shafts described herein. In embodiments, the first plurality of individual composite elements and the second plurality of individual composite elements can include a polymeric matrix or a fiber-reinforced polymer-matrix. Hardening can include solidifying or curing based on a composition of the first and second plurality of composite elements, where solidifying is used for a thermoplastic polymeric matrix and curing is used for a thermoset polymeric matrix. In certain embodiments, the method can further include embedding or placing one or more axial or circumferential composite elements in or over the composite web to reinforce the composite web.

In certain embodiments, forming the mandrel can include forming a washable material to have the one or more undulating portions along the axis of the mandrel. In certain such embodiments, removing the mandrel can include applying a fluid to the washable mandrel to dissolve the washable mandrel to form the hollow shaft.

In certain embodiments, forming the mandrel can include forming the washable mandrel to have the one or more undulating portions over a metallic cylindrical sub-mandrel and removing the mandrel can include removing the metallic cylindrical sub-mandrel from the washable material, and applying a fluid to the washable mandrel to dissolve the washable mandrel to form the hollow shaft.

In certain embodiments, forming the mandrel can include installing a plurality of axi-symmetric washable rings to a metallic cylindrical sub-mandrel to form the one or more undulating portions and removing the mandrel can include removing the metallic cylindrical sub-mandrel from the washable rings, and applying a fluid to the washable rings to dissolve the washable rings to form the hollow shaft.

In certain embodiments, forming the mandrel can include installing a plurality of circumferentially segmented rings to a metallic cylindrical sub-mandrel to form the one or more undulating portions and removing the mandrel can include removing the metallic cylindrical sub-mandrel from the segmented rings, and disassembling the segmented rings to form the hollow shaft. The segmented rings can be comprised of segments connected along the circumferential orientations by creating closed-loop rings, the segments joined to one another at respective joints.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
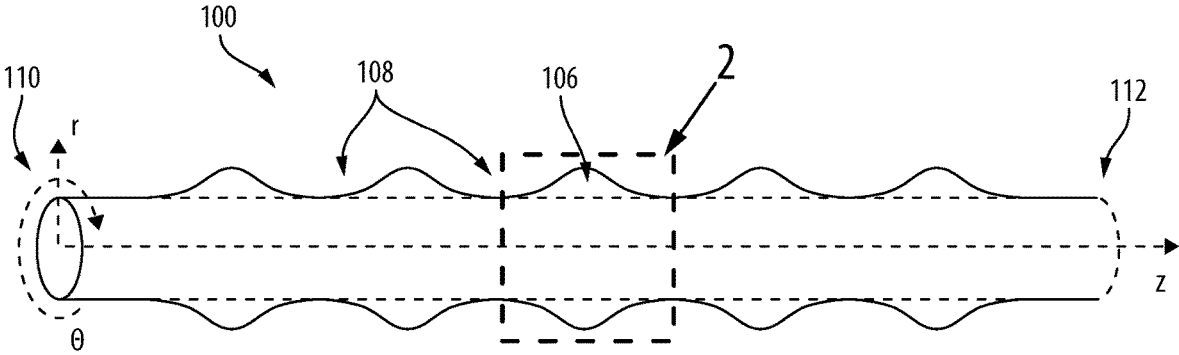
FIG. 1 is a side elevation view of a composite shaft in accordance with this disclosure, showing a side profile of the shaft.
Figure 2:
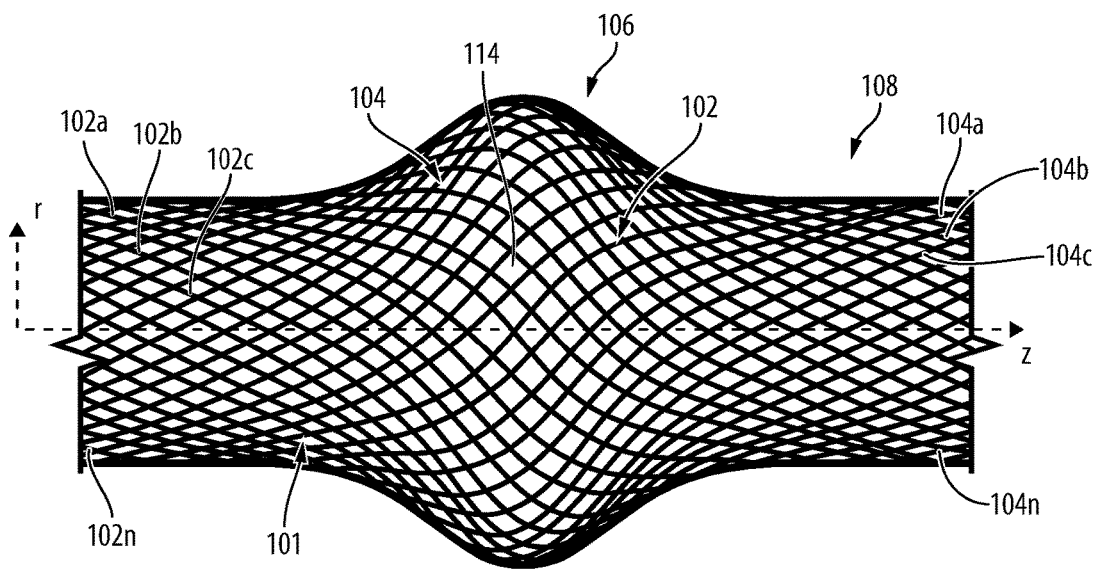
FIG. 2 is an enlarged partial side view of an embodiment of the composite shaft of FIG. 1, showing a composite web structure.

Reference will now be made to the drawings wherein like reference numerals identify similar structural features or aspects of the subject disclosure. For purposes of explanation and illustration, and not limitation, an illustrative view of an embodiment of a composite shaft in accordance with the disclosure is shown in FIG. 1 and is designated generally by reference character 100. Other embodiments and/or aspects of this disclosure are shown in FIGS. 2-25.

Referring to FIGS. 1-4B, in accordance with at least one aspect of this disclosure, a composite shaft 100 can include a plurality of composite elements 101 arranged about an axis Z to form a hollow shaft (e.g., shaft 100). In certain embodiments, as shown, the shaft 100 can include one or more undulating portions 106 (e.g., as plurality as shown) and one or more of portions 108 (e.g., a plurality as shown) between the undulating portions 106. The one or more undulating portions 106 can extend radially outward from the shaft and can be axi-symmetric.

Figure 3:
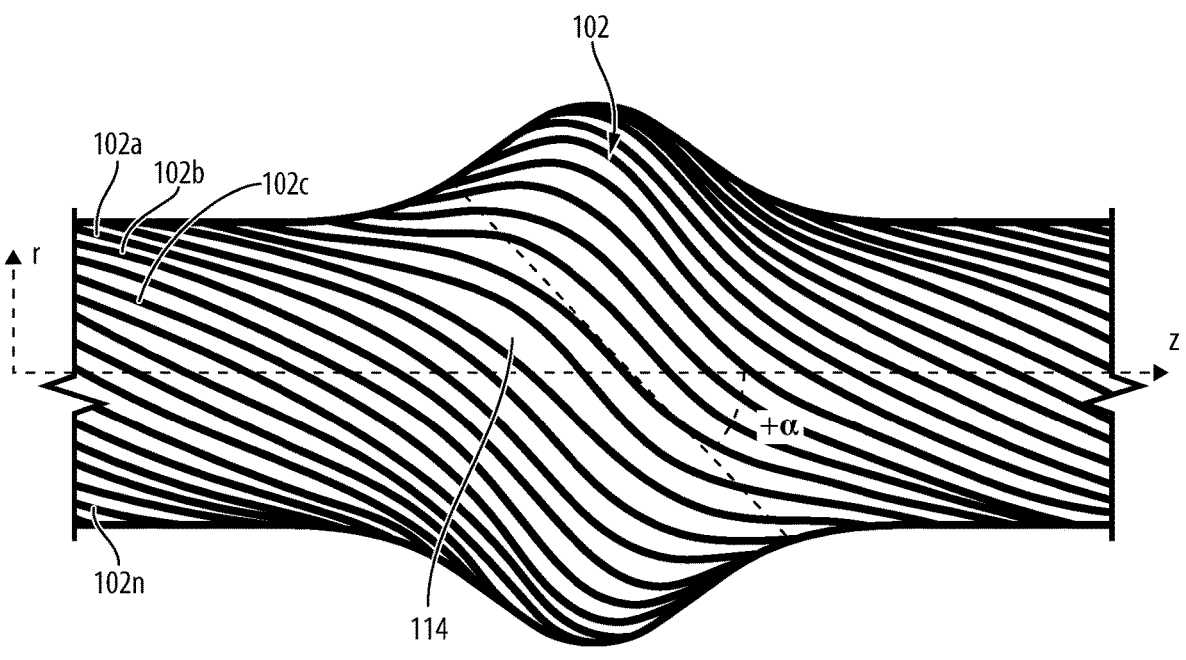
FIG. 3 is an enlarged partial side view of an embodiment of the composite shaft of FIG. 1, showing a portion of the composite web structure of FIG. 2.
Figure 4A:
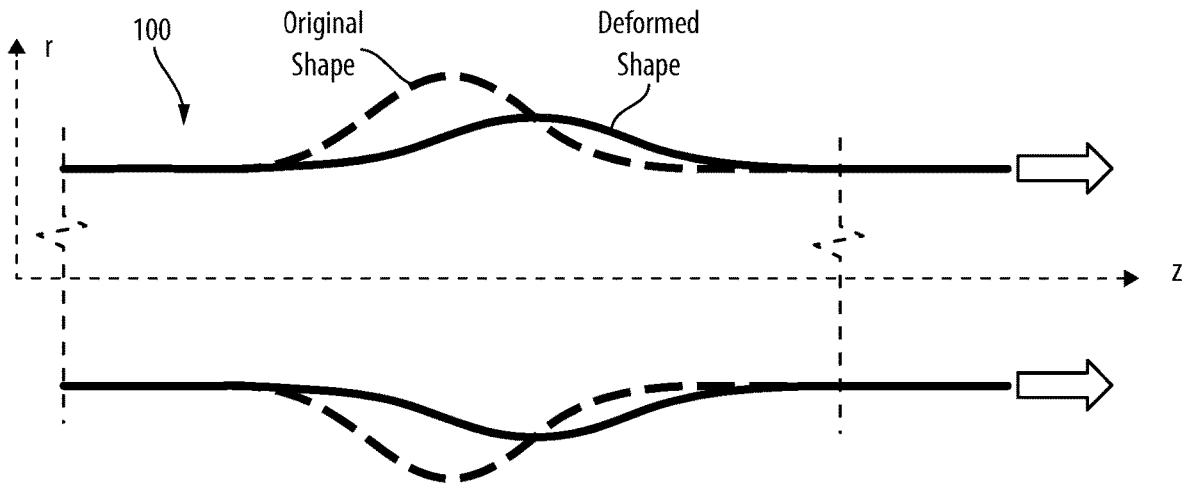
FIGS. 4A and 4B are deformation diagrams showing the composite shaft of FIG. 1 under tension and compression, respectively, as axial cross-sections.
Figure 4B:
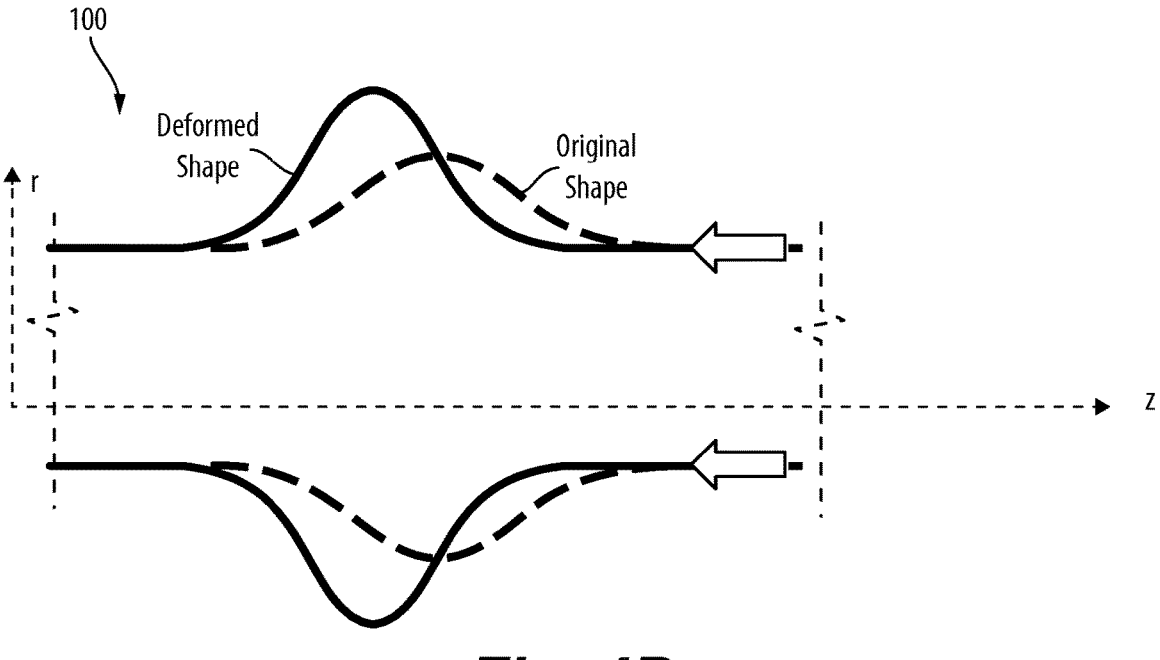

The plurality of composite elements 101 can include a first group 102 of the composite elements 101 arranged about the axis Z offset by an angle +α and a second group 104 of the composite elements 101 arranged about the axis offset by an angle −α to form a web with the first group 102 of composite elements 101. The angle α is measured relative to the axis Z and tangent to the surface of the shaft 100, e.g., as shown in FIG. 3, wherein only the first group 102 of composite elements 101 are shown. The first and second groups 102, 104 of the plurality of composite elements 101 can be configured to cooperate with one another to allow the hollow shaft 100 to be flexible under bending and/or axial load and stiff under rotational load, for example as shown in FIGS. 4A and 4B, wherein FIG. 4A shows axial tension (e.g., a radial shrinking of undulating portions 106), and FIG. 4B shows axial compression (e.g., a radial expansion of undulation segments). The flexibility of shafts under bending and/or axial load is considered as ability to deform without generating significant risks of damage.

In certain embodiments, the angle α can be between about 30° and about 60°. In certain embodiments, the angle α can be between about 35° and about 55°. The angle +αα can be constant or variable along the axis Z, and the angle –α can be the same magnitude or a different than +α, and can be constant or variable along the axis Z within the second group 104 of composite elements or variable with respect to the angle +α. As shown herein, the angles +α and –α can be constant along the axial length of the shaft 100 and can be the same magnitude with respect to one another.

As shown, in embodiments, the first group 102 of composite elements can include a first plurality 102 of individual composite elements 102*a*, *b*, *c* . . . *n* arranged in a spiral along the axis Z of the shaft 100 in a first spiral direction (e.g., clockwise as viewed from one axial end 110), and the second group 104 of composite elements can include a second plurality 104 of individual composite elements 104*a*, *b*, *c* . . . *n* arranged in a spiral along the axis Z of the shaft 100 in a second spiral direction opposite of the first spiral direction (e.g., counter-clockwise as viewed from the same axial end 110). The first and second spiral directions can be symmetric relative to the axis Z.

Figure 5:
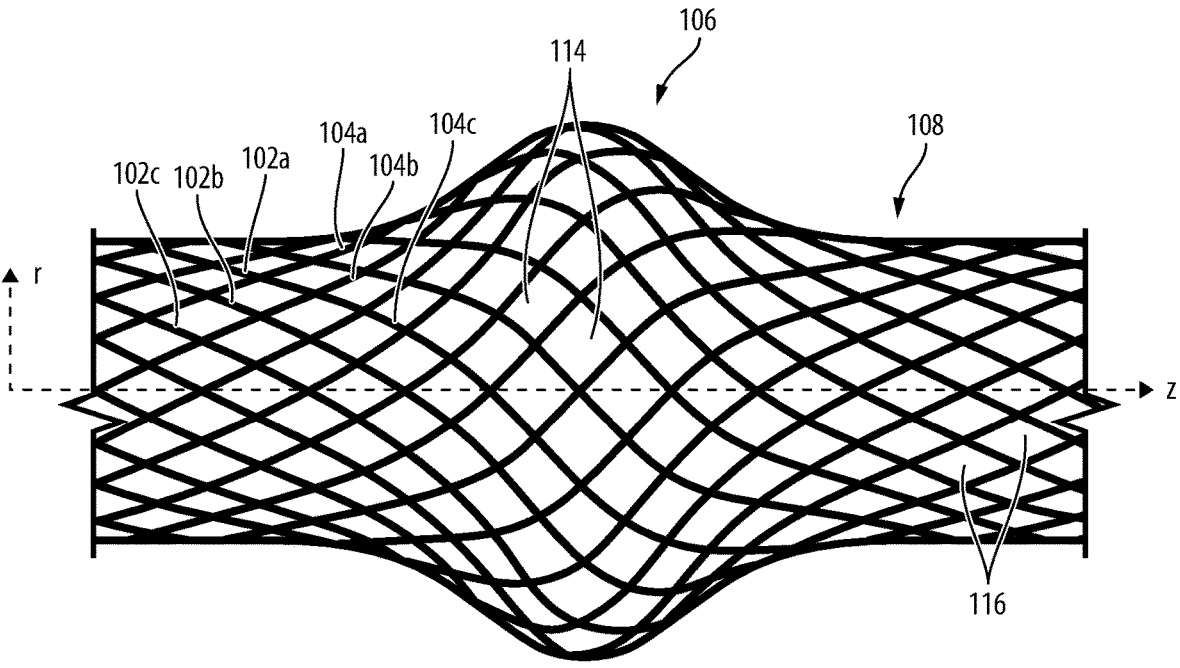
FIG. 5 is an enlarged partial side view of an embodiment of the composite shaft of FIG. 1, showing another composite web structure.
Figure 6:
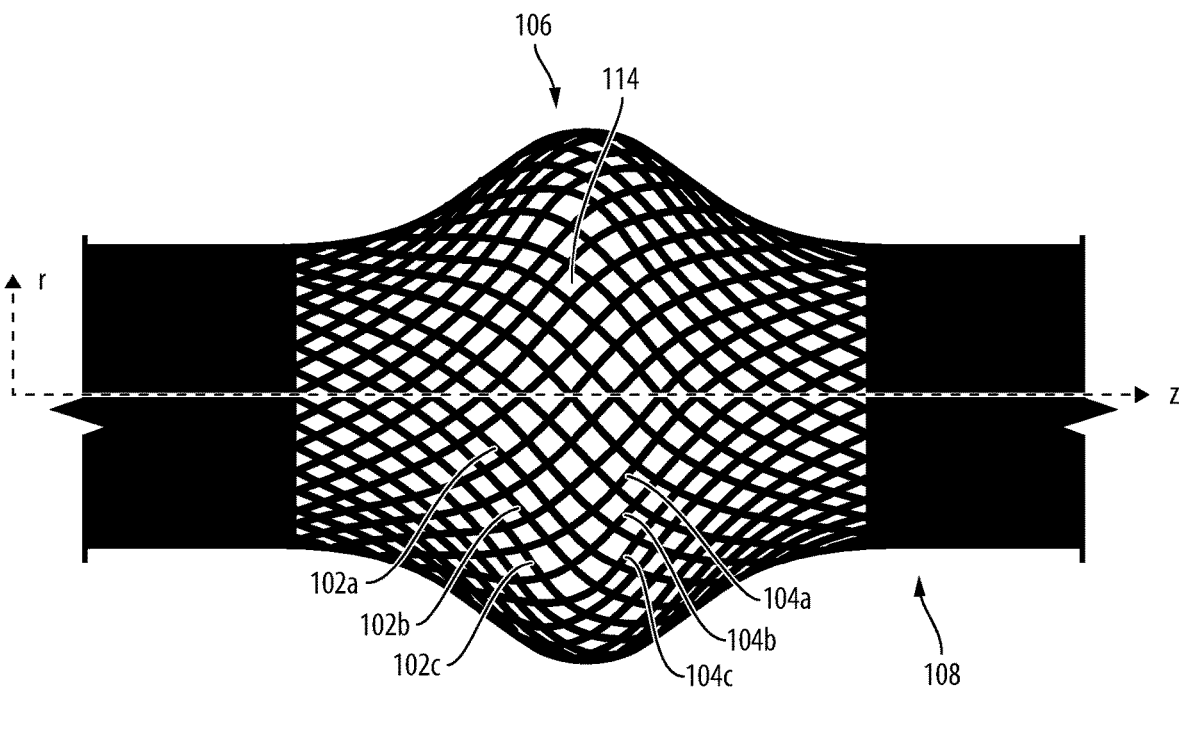
FIG. 6 is an enlarged partial side view of an embodiment of the composite shaft of FIG. 1, showing another composite web structure.
Figure 7:
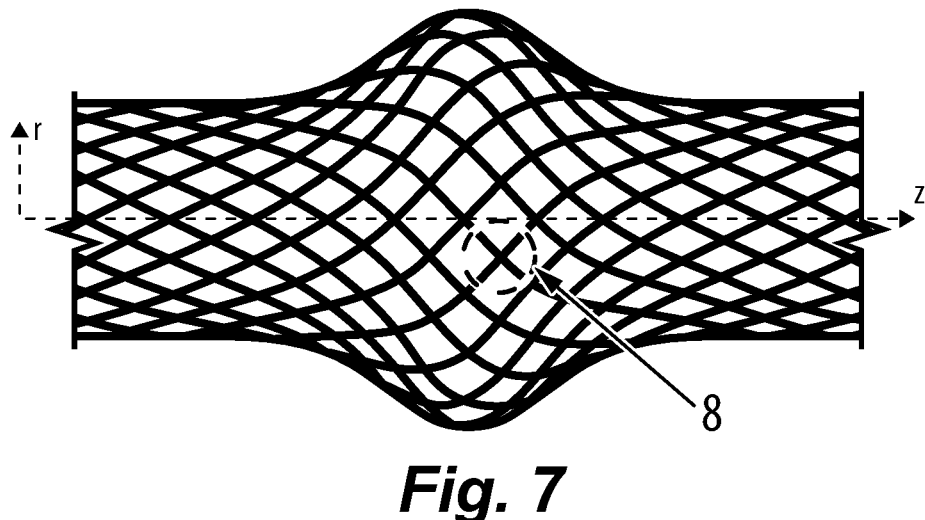
FIG. 7 is an enlarged partial side view of an embodiment of the composite shaft of FIG. 1, showing another composite web structure.
Figure 8:
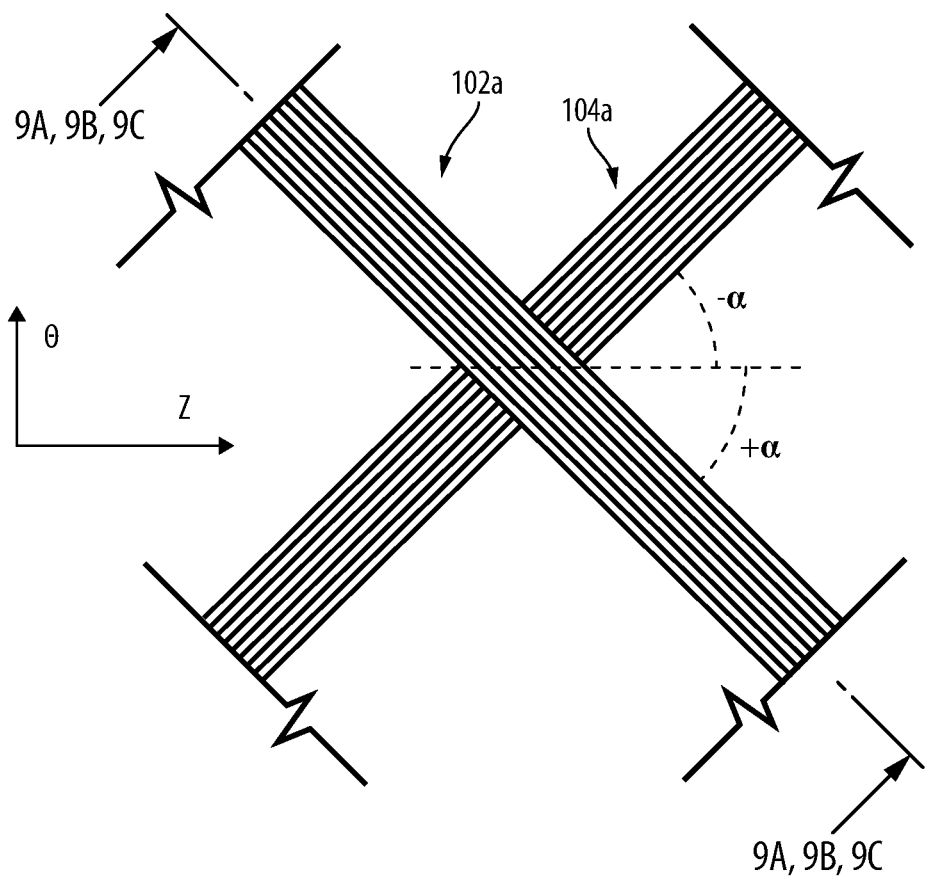
FIG. 8 is an enlarged partial view of the composite web structure of FIG. 7 at an intersection of composite elements.

With reference now to FIGS. 5 and 6, in embodiments, the individual composite elements 102*a*, *b*, *c* . . . *n* can be circumferentially spaced from one another about the axis Z and the second plurality of individual composite elements 104*a*, *b*, *c* . . . *n* can be circumferentially spaced from one another about the axis Z such that a gap 114 is formed between each of individual composite element 102*a*, *b*, *c* . . . *n* and a gap 114 is formed between each of individual composite element 104*a*, *b*, *c* . . . n. In certain such embodiments, a density of the plurality of composite elements 101 can be constant along the axis Z, where a density of the composite elements 101 can refer to a relative area of the gap 114 between each individual composite element of the plurality of composite elements 102, 104. In embodiments, the plurality of composite elements 101 can have a constant density along the shaft 100 in an axial direction such that respective gap 114 formed between each of the individual composite elements can have a constant size along the axial length of the shaft 100.

In certain embodiments, the plurality of composite elements 101 can have a variable density along the shaft 100 in an axial direction such that respective gap 114 formed between each of individual composite element has a differing area. In certain such embodiments, the element count (e.g., the number of individual composite element placed about the axis in the circumferential direction) may remain the same along the axial length of the shaft 100, while some portions of the shaft 100 may exhibit a tighter spiral density than others. For example as shown in FIG. 6, where the gap 114 in all locations is smaller than the gap 114 shown in FIG. 5, showing that the shaft of FIG. 6 has more individual composite elements than the shaft of FIG. 5. Also shown in FIG. 6, the gap 114 between elements 101 varies along the shaft 100 in the axial direction, where the undulating portions 106 have a wider gap 114 than the portions 108 between undulating portions 106. Thus, for the shaft 100 of FIG. 6, the undulating portions 106 have a lower density than the portions 108, even though the number of composite elements 101 does not change between the two portions 106 and 108 on the same shaft 100. In certain embodiments, e.g., as shown in FIG. 6, the density can be so high that virtually no gap 114 is formed between elements and the individual composite elements form a continuous shell, e.g., as shown on portions 108.

In certain embodiments, a density of the composite elements can refer to an element count of composite elements on the shaft 100 in the circumferential direction, where the element count remains constant along the shaft, regardless of whether the size of the gap 114 remains the same or varies. In certain embodiments, the shaft 100 can have a low density web with a low number of elements, having a large but constant gap 114 therebetween or the shaft 100 an have a high density web with a high number of elements, having a small but constant gap therebetween, e.g., as shown in the difference between FIGS. 5 and 6, where FIG. 5 has a relatively low density web with large constant gaps 114, and FIG. 6 has a relatively high density web (e.g., higher than FIG. 5), as well as a variable density with respect to the gaps 114. Here, the shaft 100 of FIG. 5 has fewer composite elements (e.g., fewer individual composite elements) than the shaft 100 shown in FIG. 6.

Figure 9A:
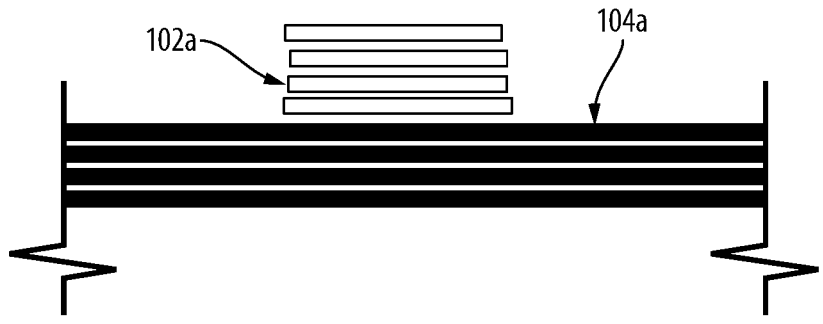
FIG. 9A is an enlarged cross-sectional view of the intersection of FIG. 8, showing a relative placement of plies of the composite elements, e.g., stacked.
Figure 9B:
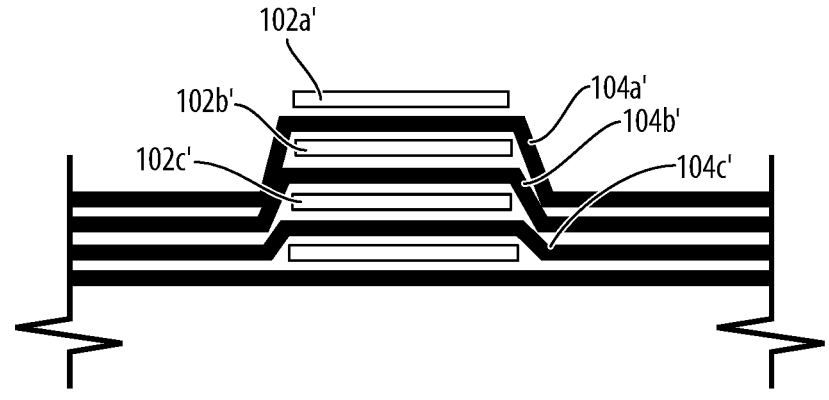
FIG. 9B is an enlarged cross-sectional view of the intersection of FIG. 8, showing another relative placement of plies of the composite elements, e.g., interleaved.
Figure 9C:
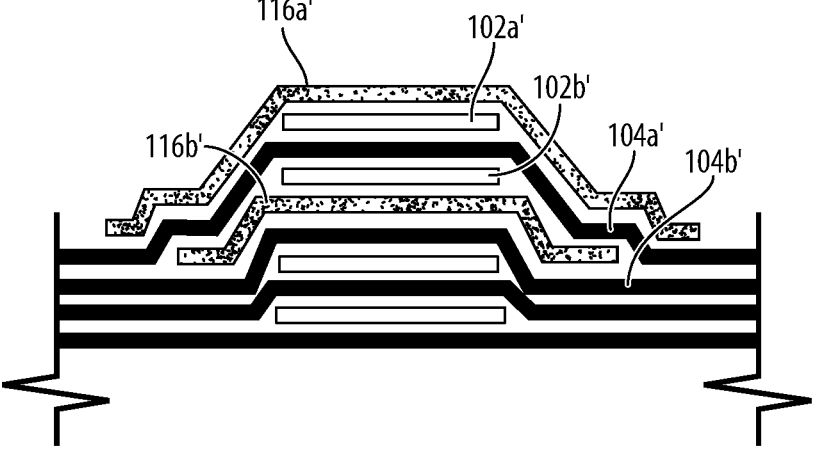
FIG. 9C is an enlarged cross-sectional view of the intersection of FIG. 8, showing another relative placement of plies of the composite elements, e.g., interleaved with, at least, one reinforcing pad.

With reference now to FIGS. 7-9C, in certain embodiments, each composite element e.g., 102*a*, 104*a* of the first and second plurality of individual composite elements 102, 104 can further consist of a plurality of plies, e.g., 102*a'*, 102*b'*, 102*c'*, 104*a'*, 104*b'*, 104*c'*. The plies can be overlaid on top of each other, e.g., as shown in FIGS. 7-9A, wherein the plies of the first group 102 are all on top of the plies of the second group 104. In certain embodiments, as shown in FIGS. 9B and 9C, the plies of the first group 102 can be interleaved with the plies of the second group 104 (e.g., alternating between the first and second groups of plies layer by layer). In certain embodiments, as shown in FIG. 9C, the plies of the first group 102 of can be interleaved with the plies of the second group 104 and a reinforcing pad 116 (e.g., comprising a plurality of plies 116*a'*, 116*b'*) having a length less than an axial length of the shaft 100, can be interleaved between the plies of the first group 102 and the plies of the second group 104. In certain such embodiments, the plies of the reinforcing pad 116 can be interleaved between each layer of the first and second groups 102, 104, or can be interleaved at varying intervals, for example, alternating every two or three layers, e.g., as shown.

Figure 10:
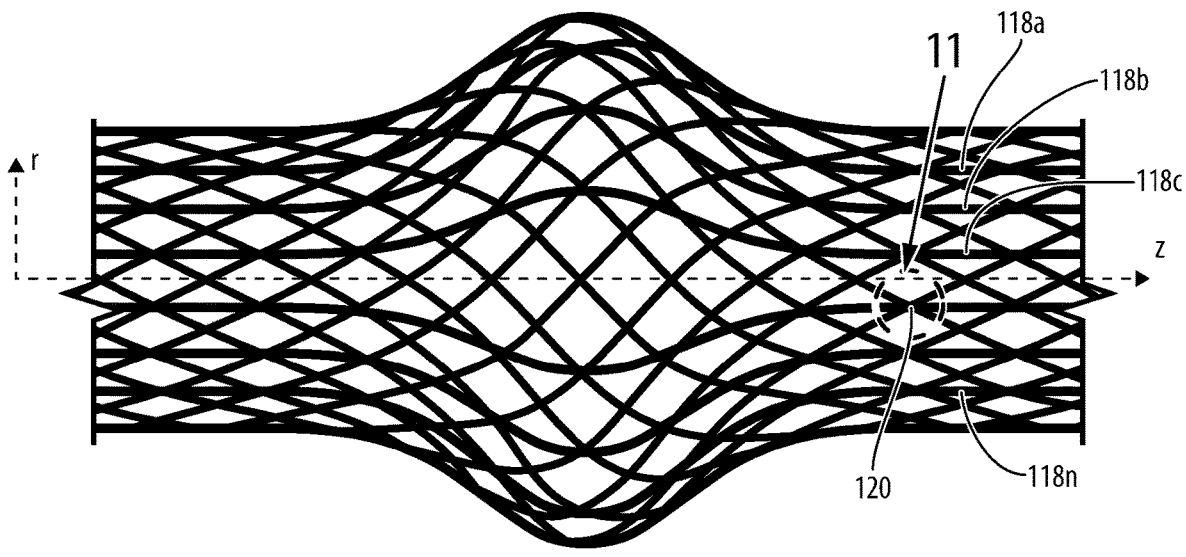
FIG. 10 is an enlarged partial side view of an embodiment of the composite shaft of FIG. 1, showing another composite web structure having additional axial strands.
Figure 11:
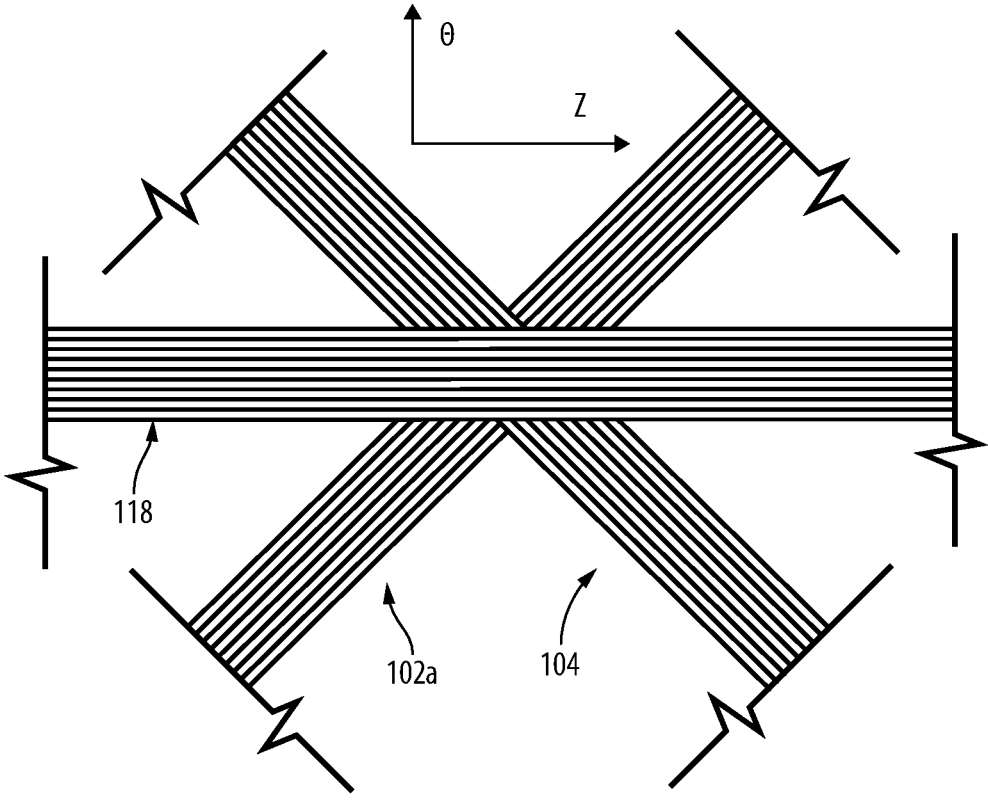
FIG. 11 is an enlarged partial view of the composite web structure of FIG. 10 at an intersection of composite elements.

Referring to FIGS. 10 and 11, in certain embodiments, the plurality of composite elements 101 can include a third group 118 of composite elements arranged axially along the axis Z and circumferentially spaced apart from one another about the axis Z. The third group 118 of composite elements can include a third plurality of individual composite elements 118*a*, *b*, *c* . . . n laid along the axis Z as axial strands. Each composite element of the third group 118 can further comprise individual plies. The third group 118 of composite elements can be arranged such that they intersect the first and second groups 102, 104 at respective intersection 120. The axial strands 118 can be placed circumferentially about the axis Z at regular, constant intervals or varying intervals.

Figure 12:
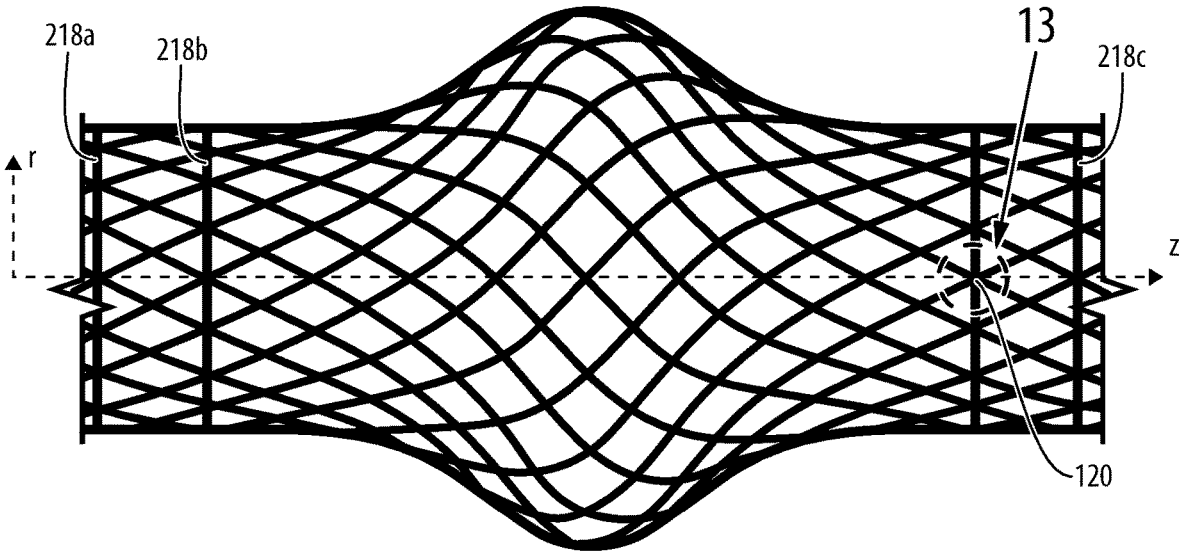
FIG. 12 is an enlarged partial side view of an embodiment of the composite shaft of FIG. 1, showing another composite web structure having additional circumferential hoops.
Figure 13:
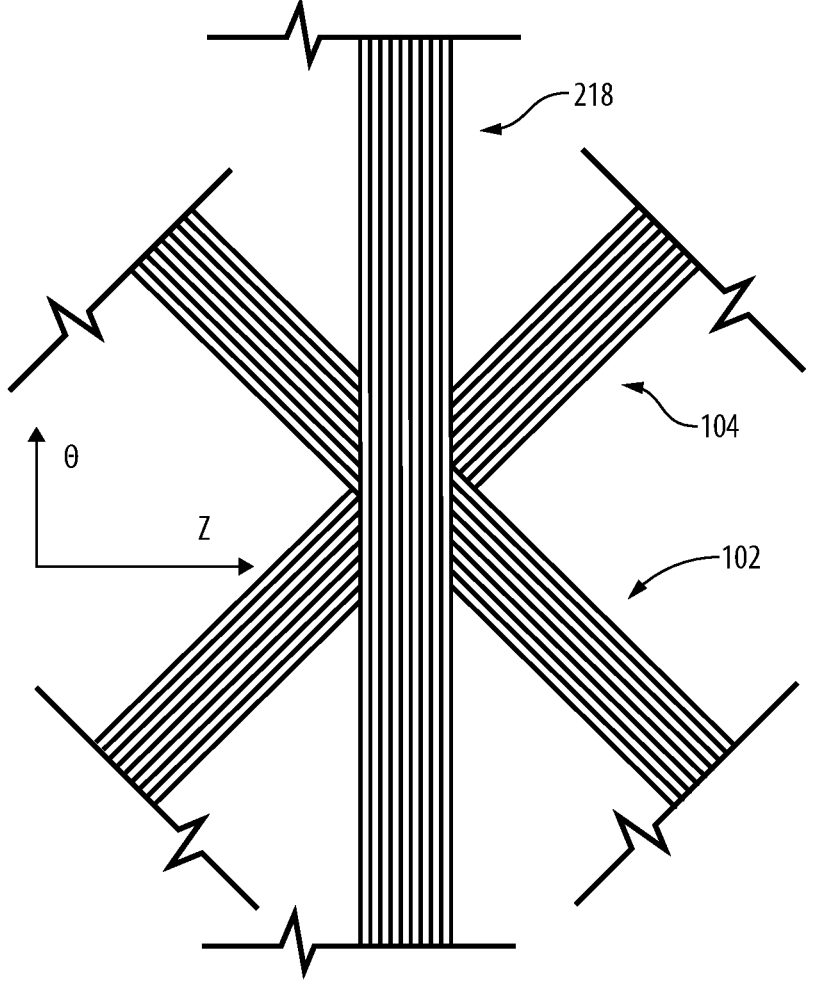
FIG. 13 is an enlarged partial view of the composite web structure of FIG. 12 at an intersection of composite elements.

As shown in FIGS. 12 and 13, in certain embodiments, the third group 218 of composite elements can be arranged generally circumferentially (e.g., circumferentially or almost circumferentially) about the axis Z (e.g., in a hoop direction) axially spaced apart from one another along the axis Z such that the individual composite elements 218*a*, *b*, *c* form hoops around the shaft 100. The hoops 218 can intersect the first and second groups 102, 104 at the intersection 120. The hoops 218 can be placed axially along the shaft 100 at regular, constant intervals or variable intervals (discussed further with respect to FIGS. 16A-16E).

Figure 14:
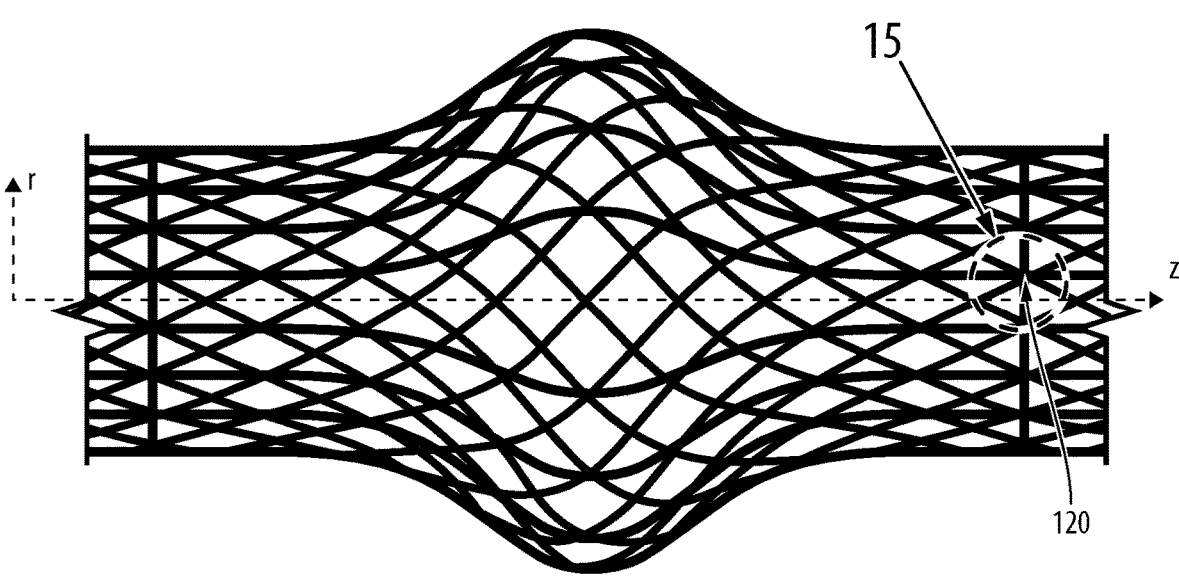
FIG. 14 is an enlarged partial side view of an embodiment of the composite shaft of FIG. 1, showing another composite web structure having additional axial strands and circumferential hoops.
Figure 15:
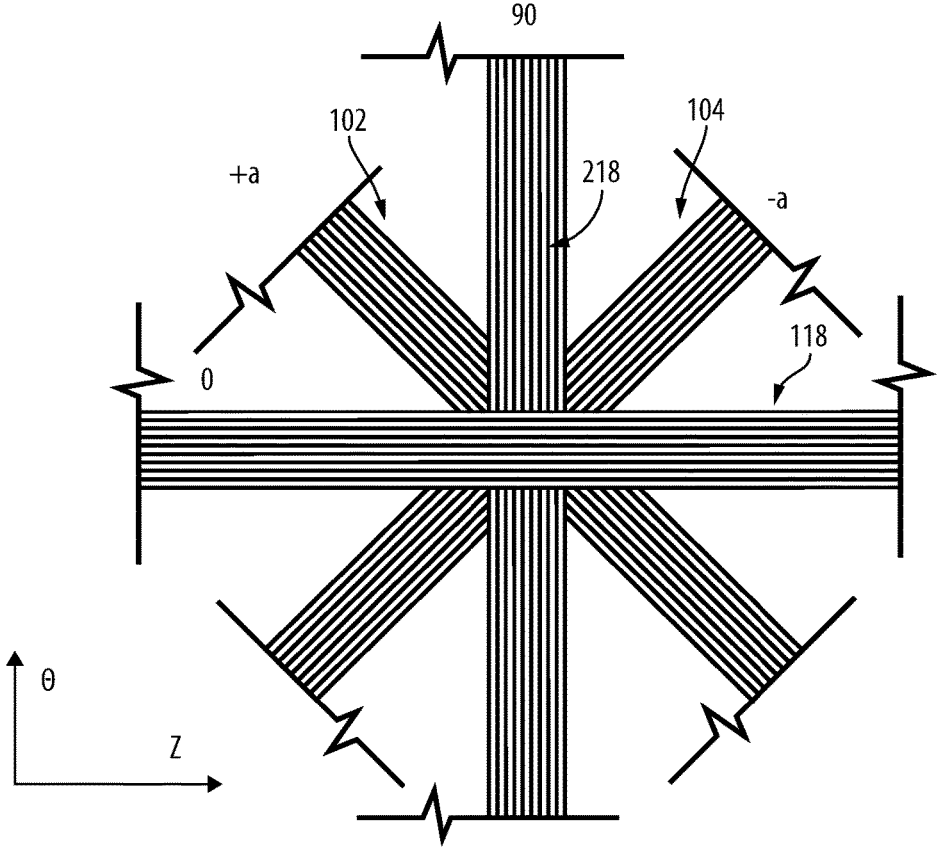
FIG. 15 is an enlarged partial view of the composite web structure of FIG. 14 at an intersection of composite elements.

As shown in FIGS. 14 and 15, in certain embodiments, the shaft 100 can include the first and second groups 102, 104 of composite elements, and both the axial strands 118 as a third group of composite elements and the hoops 218 as a fourth group of composite elements. In such embodiments, each of the groups 102, 104, 118, 218 of composite elements 101 can intersect at a common point (e.g., respective intersection 120). In any of the embodiments shown in FIGS. 10-15, the individual composite elements of the first and second groups 102, 104, the axial strands 118, and the hoops 218 can have a plurality of plies that can be over laid, interleaved, or a combination of over laid and interleaved and may include the reinforcing pad plies (e.g., 116a', 116b') if desired. For example, any embodiment of overlay or weave as shown in FIGS. 9A-9C is possible for the embodiments of the shafts shown in FIGS. 10-15.

Figure 16A:
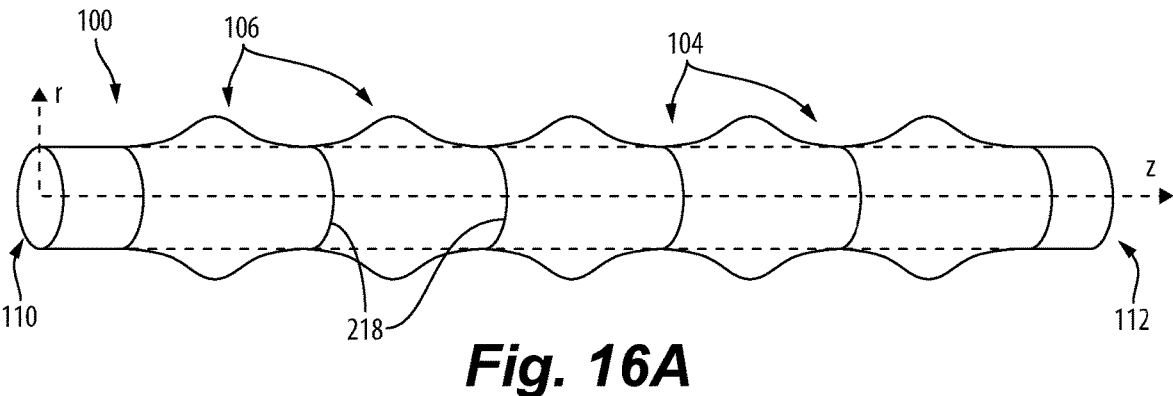
FIGS. 16A-16E are side perspective views of a composite shaft, showing varying placements of circumferential hoops along the shaft.
Figure 16B:
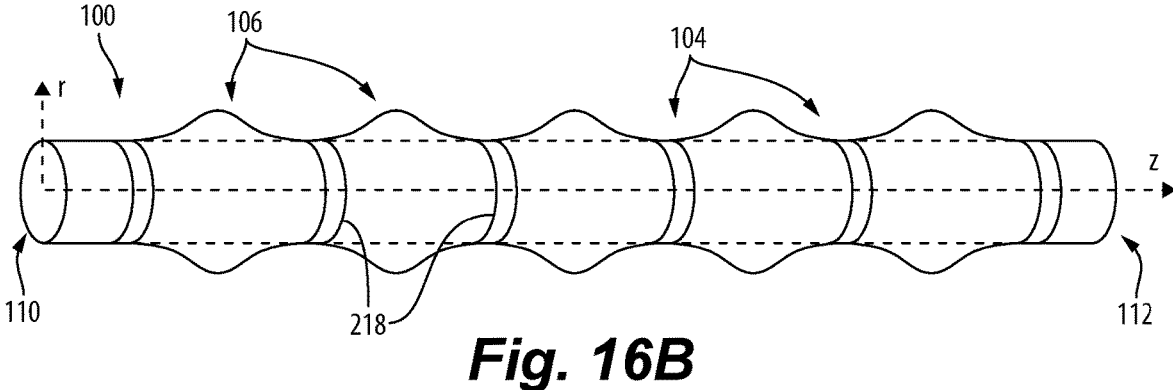
Figure 16C:
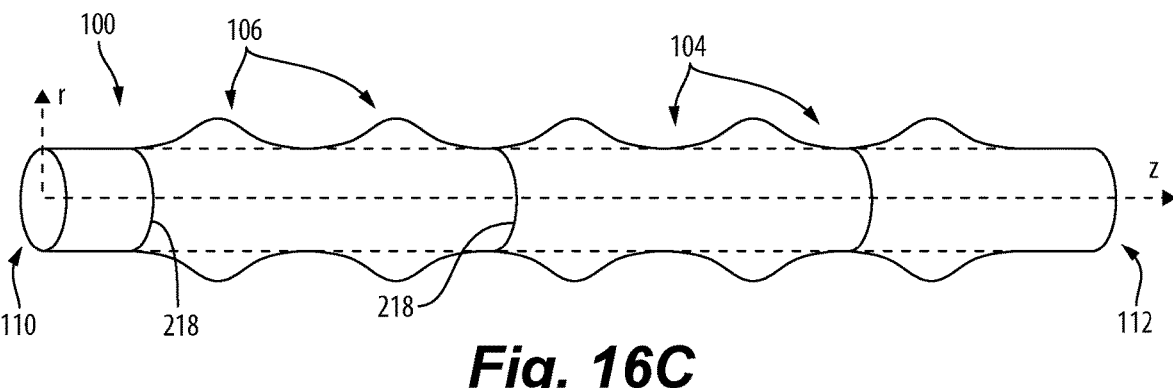
Figure 16D:
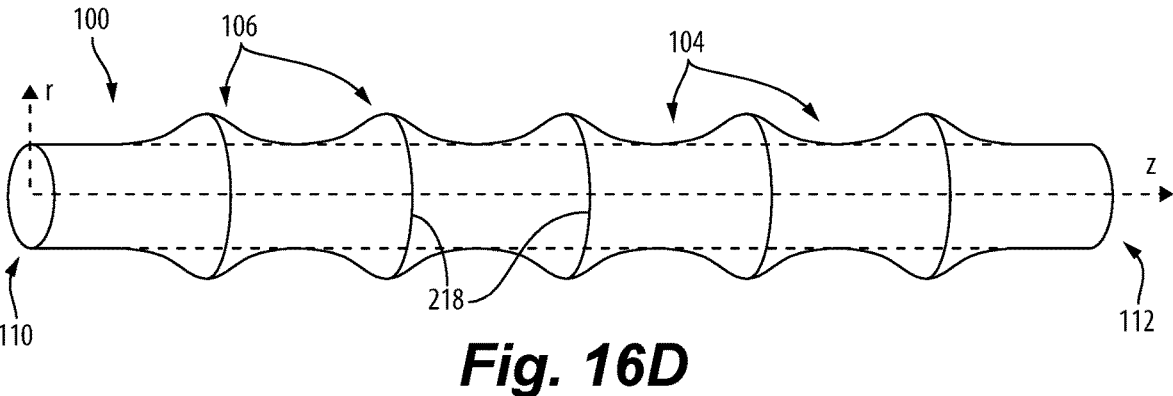
Figure 16E:
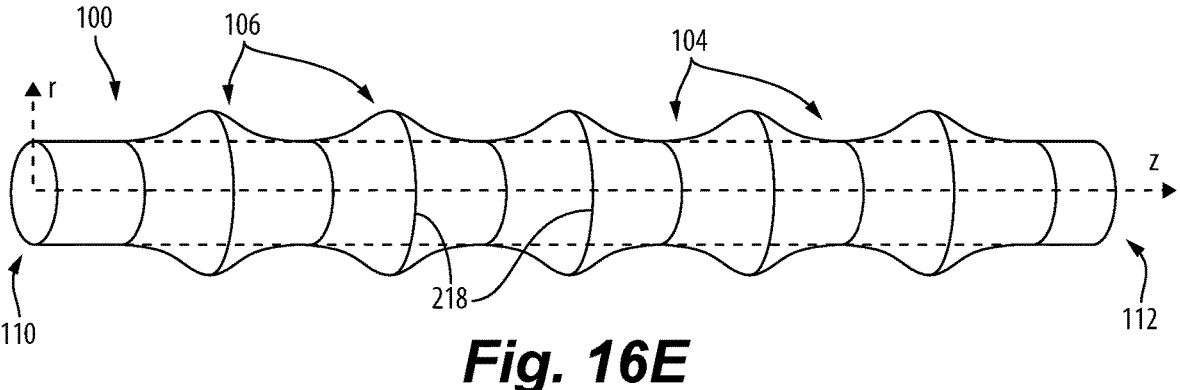
Figure 17:
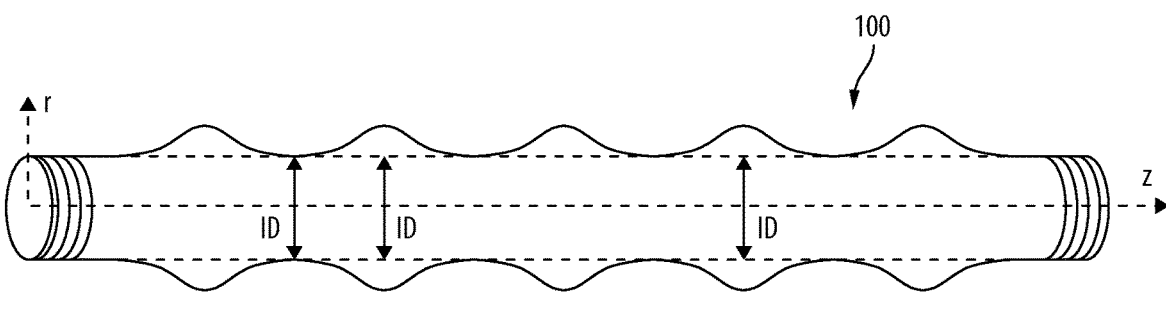
FIG. 17 is an axial cross-sectional view of a composite shaft having a constant diameter profile with added undulations.

With reference now to FIGS. 16A-17, in certain embodiments, the hoops 218 can be axially spaced apart from one another along the axis Z and positioned on the portions 108 only, between the undulating portions 106 (e.g., FIGS. 16A, B, C). In certain embodiments, the hoops 218 can be positioned on the undulating portions 106 only (e.g., FIG. 16D). In certain embodiments, the hoops 218 can be positioned on both the undulating portions 106 and the portions 108 between the undulating portions 106 (e.g., FIG. 16E). In embodiments, the hoops 218 can be placed at regular intervals or varying intervals along the axial length of the shaft 100. In certain embodiments, more hoops 218 can be included on the portions 108 than on the undulating portions 106 (e.g., as shown in FIG. 16B). In certain embodiments, only some portions 108 can include hoops 218 (e.g., as shown in FIG. 16C). In certain embodiments, the hoops can be positioned or concentrated at the axial ends 110, 112 of the shaft (e.g., as shown in FIG. 17) and may be embedded therein.

Figure 18:
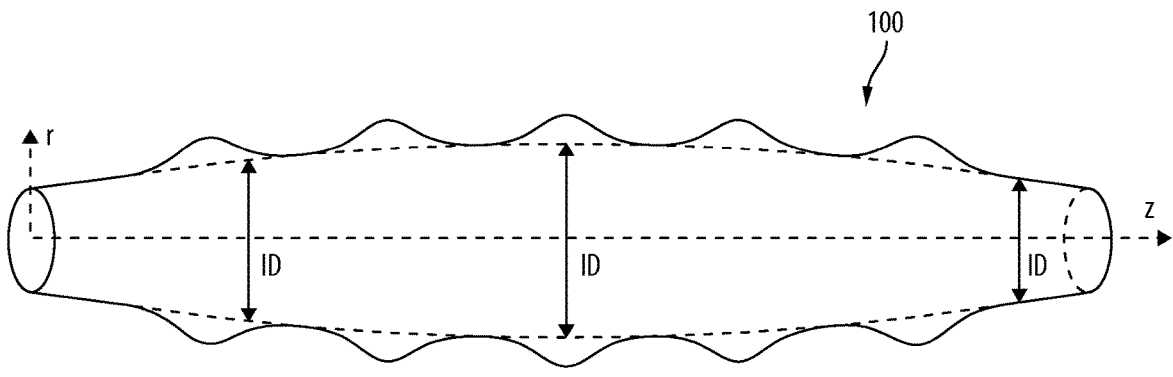
FIG. 18 is an axial cross-sectional view of a composite shaft having a convex profile with added undulations.
Figure 19:
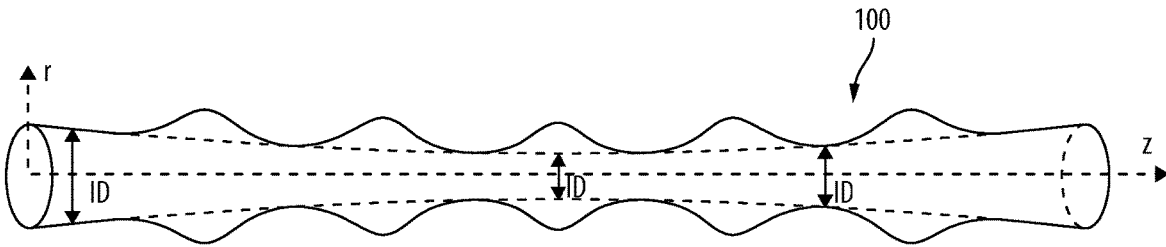
FIG. 19 is an axial cross-sectional view of a composite shaft having concave profile with added undulations.

With reference now to FIGS. 17-20, in certain embodiments, an axial cross-sectional profile of the hollow shaft 100 can be constant along the axial length of the shaft 100 (e.g., as shown in FIG. 17), or in certain embodiments, the axial cross-sectional profile of the hollow shaft can be convex along the axial length of the hollow shaft 100 (e.g., as shown in FIG. 18, wherein the shaft diverges towards a midpoint of the shaft and converges on the axial ends of the shaft), or in certain embodiments, the axial cross-sectional profile of the hollow shaft can be concave along the axial length of the hollow shaft (e.g., as shown in FIG. 19, wherein the shaft converges towards a midpoint of the shaft and diverges at the axial ends of the shaft). The hollow shaft 100 can have a constant symmetric profile along the axis such that an inner diameter (ID) of the hollow shaft is cylindrical, as shown in FIG. 17 for example, wherein the ID is measured between the narrow portions 104 (e.g., along the dotted line extending between ends 110 and 112). In certain embodiments, the hollow shaft 100 can have a variable asymmetric profile along the axis such that the variable asymmetric cylindrical profile when viewed perpendicular to the axis is convex (e.g., FIG. 18) or concave (e.g., FIG. 19). In certain such embodiments, the inner diameter ID of the hollow shaft 100 can vary along the axis as shown in FIGS. 18 and 19. In embodiments, the hollow shaft 100 can be tubular.

In embodiments, the plurality of composite elements 101 can include a plurality of individual composite elements oriented along respective axes of the individual composite elements. In certain embodiments, the individual composite elements can include unidirectional oriented fibers in a polymeric matrix to form a fiber-reinforced polymer-matrix composite. In embodiments, the polymeric matrix composite can include a thermoset or a thermoplastic. The fiber-reinforced polymer-matrix composite can include the unidirectionally oriented fibers including any of carbon, glass and/or organic (e.g., Kevlar) fibers, for example.

Referring now to FIGS. 20-26, in accordance with at least one aspect of this disclosure, a method 300 of making a composite shaft (e.g., any one of shafts 100 described herein) can include forming a mandrel 322 to have one or more undulating portions 306 and a one or more portions 308 between the plurality of undulating portions 306 along an axis Z of the mandrel 322. The method can include overlaying a composite web 301 onto an external surface 324 of the mandrel 322. Overlaying the composite web 301 onto the external surface 324 of the mandrel 322 can include placing a first plurality of individual composite elements (e.g., elements 102) in a first spiral orientation along the axis Z of the mandrel 322 in a first direction (e.g., clockwise), and placing a second plurality of individual elements (e.g., elements 104) in a second spiral orientation along the axis Z of the mandrel 322 in a second direction symmetric to but opposite from of the first direction (e.g., counter clockwise) using automated fiber placement to form any one of the hollow shafts 100 described hereinabove. In certain embodiments, the method 300 can include embedding or placing one or more axial or circumferential elements (e.g., axial strands 118 and/or hoops 218) in or over the composite web 301 to reinforce the composite web 301 as needed for a given application.

The method 300 can then include hardening the composite web 301 on the mandrel 322. Hardening can include one or more of curing (e.g., for a thermoset polymeric matrix), solidifying (e.g., for a thermoplastic polymeric matrix) or otherwise hardening the web 301 based on the material of the web 301. The method 300 can further include removing the mandrel 322 from within the composite web 301 to leave behind the hollow shaft (e.g., any embodiment of hollow shaft 100 as described herein).

Figures 20, 21:
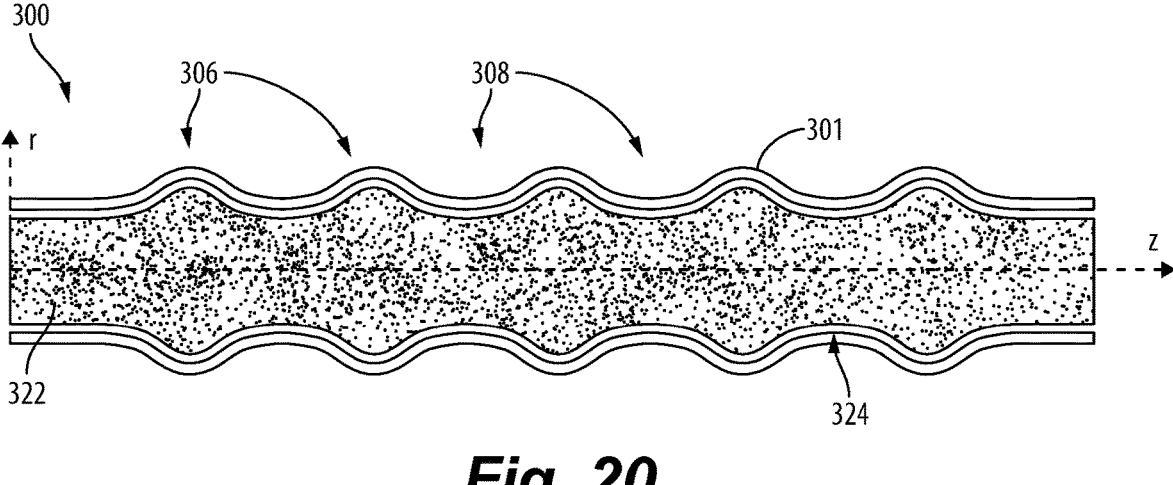
FIG. 20 is an axial cross-sectional elevational view of an embodiment of a method of making a composite shaft.
FIG. 21 is an axial cross-sectional side elevational view of another embodiment of a method of making a composite shaft.

As shown in FIG. 20, forming the mandrel 322 can include forming the mandrel 322 from a washable material to have the one or more undulating portions 306. In such embodiments, removing the mandrel 322 can include applying a fluid to the washable mandrel 322 to dissolve the washable mandrel to leave behind the hollow shaft 100. Removing the mandrel 322 can be completed after hardening the composite web 301. The washable mandrel 322 can be formed from salt for example, and the fluid used to wash away the mandrel 322 can be water. Any suitable washable material and corresponding washing fluid is contemplated herein.

In certain embodiments, such as shown in FIG. 21, forming the mandrel 322 can include forming the washable mandrel 322 to have the one or more undulating portions 306 over a metallic cylindrical sub-mandrel 422. In such embodiments, removing the mandrel can include removing the metallic cylindrical sub-mandrel 422 from the washable mandrel 322 first, then applying the washing fluid to the washable mandrel 322 to dissolve the mandrel 322 to leave behind the hollow shaft 100. In certain embodiments, the washable mandrel 322 can be removed before the metallic sub-mandrel 422.

Figure 22:
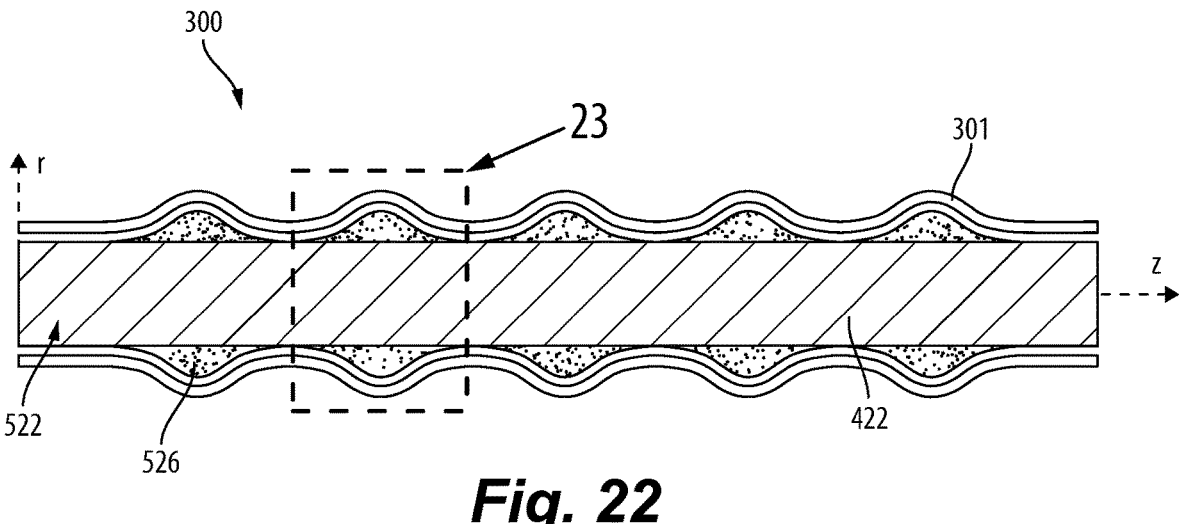
FIGS. 22 and 23 are an axial cross-sectional side elevational and a side elevational view of another embodiment of a method of making a composite shaft, including a perspective view of an undulation area.
Figure 23:
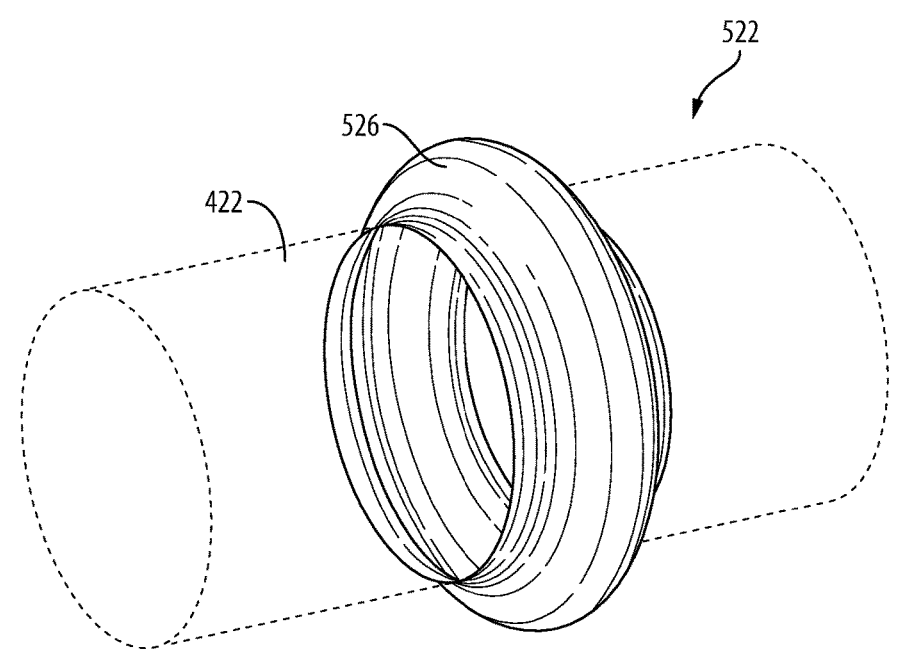

In certain embodiments, as shown in FIGS. 22 and 23, forming the mandrel 522 can include installing a plurality of washable rings 326 to the metallic cylindrical sub-mandrel 422 to form the one or more undulating portions 308. In such embodiments, removing the mandrel 522 can include removing the metallic cylindrical sub-mandrel 422 from the washable rings 326, and then applying the washing fluid to the washable rings 326 to dissolve the washable rings 326 to leave behind the hollow shaft 100. In certain embodiments, the washable rings 525 can be removed before the metallic sub-mandrel 422.

Figure 24:
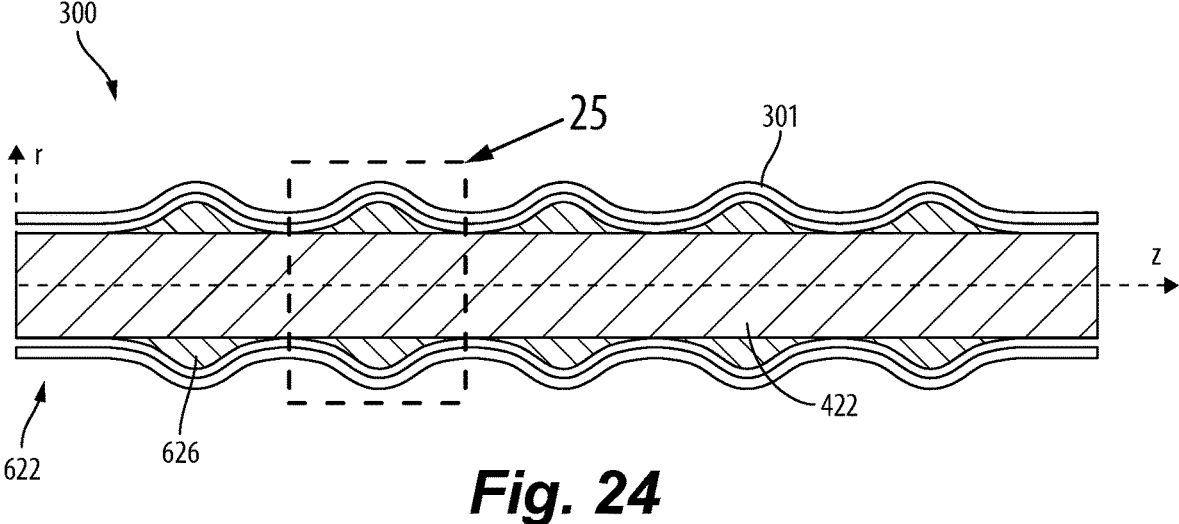
FIGS. 24 and 25 are an axial cross-sectional side elevational and a side elevational view a side elevational view of another embodiment of a method of making a composite shaft, including a perspective view of an undulation area
Figure 25:
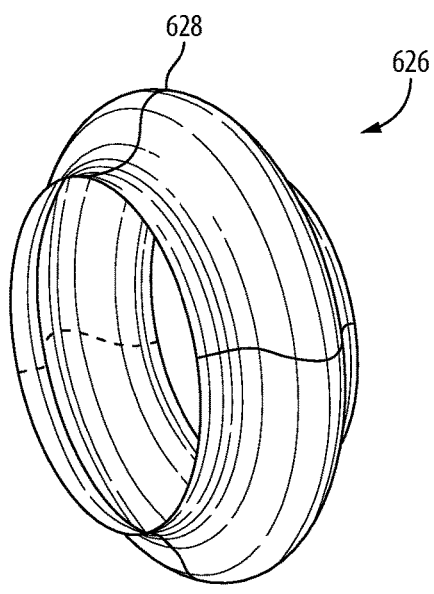

In certain embodiments, as shown in FIGS. 24-26, forming the mandrel 622 can include installing a plurality of circumferentially segmented rings 626 to a metallic cylindrical sub-mandrel 422 to form the one or more undulating portions 306. The segmented rings 626 can be comprised of segments connected along the circumferential orientation by creating closed-loop rings, where the segments are joined to one another at respective joints 628. In such embodiments, removing the mandrel 622 can include removing the metallic cylindrical sun-mandrel 422 from the segmented rings 626, and disassembling the segmented rings 626 to leave behind the hollow shaft 100. The segmented rings 626 can then be reused for forming another mandrel 622.

Drive shafts are typically expected to deliver two structural requirements: a) to be very stiff and strong under torque, but also b) to be very flexible under bending and/or axial deformations. To satisfy these requirements, a conventional drive shafts typically include a combination of a flexible axi-symmetric diaphragm and a cylindrical tube (drive shaft body). The diaphragm is usually an axi-symmetric thin-wall mechanism working as a "spring" under bending/axial loads but still very stiff under torque due to its circular shape. Along with structural efficiency of conventional diaphragms, conventional drive shafts can have a relatively high cost of manufacture, a time-consuming fabrication process, high requirements for quality, require parts for machining in advance, and potential damage to weaker portions of the shaft. In addition, conventional diaphragms can require some additional space in the radial direction, making the drive shaft body with smaller diameter due to limited available space. This can reduce its structural efficiency, especially with respect to strength and vibrational responses.

Embodiments can include a "diaphragm-less" drive shaft system, and methods of making such integrated shaft-coupling flexible composite drive system (e.g., as shown in FIGS. 1-8) to improve the conventional drive shaft in view of those challenges described above. Embodiments of a drive shaft (e.g., shaft 100) can include +α/−α mesh-type composite web with radially outward undulations. The web can be a combination of a plurality of spiral composite elements positioned under angle "+α" and a plurality of spiral composite elements positioned under angle "−α". In addition, the web can have a geometrical shape of a hollow cylinder with at least one axisymmetric radially outward undulation. In embodiments, individual composite spiral elements of each plurality are placed with gaps between the elements. Embodiments can also include drive shafts made of advanced fiber-reinforced composite materials. Embodiments of the drive shaft, and method of making the drive shaft can overcome the challenges faced by conventional shafts (e.g., with separate mechanical couplings as discussed above).

In embodiments, an axial cross-sectional shape of the undulations can include of a convex section, two concave sections and, optionally, linear or curved connecting sections between them. In embodiments, the axial cross-sectional shapes of the undulations can be symmetric or asymmetric and the undulations can be the same or different along the axial direction. In certain embodiments, the undulating portions can be included along an entire axial length of the shaft. In certain embodiments, the undulating portions can be positioned adjacent to one another so that one undulating portion connects to the adjacent undulation portion with no flat or narrow portions in between. In certain embodiments, the undulating portions can be concentrated at the axial ends of the hollow shaft and a flat portion can be defined between the undulating portions. In certain embodiments, the undulating portions can be concentrated at a center of the shaft such that the axial ends of the shaft are free of undulating portions. The undulating portions can be axi-symmetric. In embodiments, the undulating portions can have varying geometries and/or sizes from one another. In embodiments, the undulating portions can be disposed along the shaft at regular or variable intervals.

The angles "α" can be within 30° and 60° with respect to the shaft axial direction. Embodiments of the composite web can have low and high density e.g., as shown in FIGS. 5 and 6, respectively. The density can indicate a number of individual composite spiral elements per unit width. In certain embodiments, a very high density (e.g., as in FIG. 6), the web can be as a continuous shell in areas outside the undulation(s), and have a lower density within the undulation.

FIGS. 3A and 3B show schematic cross-sectional views of deformation of the drive shaft under axial tension and compression. These Figs. illustrate desired axial flexibility due to radial deformation, i.e., radial "shrinking" under axial tension or radial expansion under axial compression. This axial flexibility can provide needed bending flexibility as well.

As shown in FIGS. 9A-9C, corresponding periodic joints between spiral composite elements ca be implemented, for example, without interconnection of individual plies of different spiral elements (FIG. 9A), with interconnection (FIG. 9B) and with finite-length added patches (FIG. 9C) if needed.

Certain embodiments can include additional reinforcement in the axial direction, where individual axial composite elements follow the overall shape of a shaft with undulations (FIGS. 10 and 11) to keep noted benefits of axial flexibility (e.g., as described with respect to FIGS. 3A and 3B). In certain embodiments, a plurality of axial elements can be distributed in the hoop direction (FIGS. 12 and 13) of the shaft. These axial composite elements can be interconnected with the spiral elements. Embodiments can include the hoop elements in various locations, e.g., on the undulations, between the undulations, at the diametric tips of undulations or both, (e.g., FIGS. 16A-16E). In embodiments, if both axial and hoop reinforcement elements are implemented in addition to the spiral elements, they can all be interconnected together.

Certain embodiments can include additional optional reinforcement at the opposite ends of the shaft (e.g., as shown in FIG. 17). These areas may be needed for extra reinforcement for connections with outside flanges, for example. This additional reinforcement may also be needed for reliable embedding of corresponding ends of spiral and, if applicable, axial composite elements. Reinforcement of the ends can include additional composite plies oriented in any of 0 (axial), 90 (hoop) or "+β" or "−β" (angular) orientations with respect to the axial direction, for example. Angles "β" can be the same as angles "α" or different.

Certain embodiments can employ complex shapes of drive shafts with undulations, for example, the undulations can be applied to convex (FIG. 18) or concave (FIG. 19)

profiles of the shaft body. Such profiles can be helpful for optimization of buckling and/or vibrational behaviors of drive shafts.

With respect to methods of making, embodiments of the methods of making can be applied to fiber-reinforced polymer-matrix materials, where the fibers can be any of carbon, glass and organic (e.g., Kevlar) fibers or any of their combinations. Polymeric matrix can be or include, for example, thermoplastic or thermoset. Strength and stiffness of fiber reinforcement can be achieved if uni-directional fibers are aligned along corresponding individual orientations of spiral, axial and hoop elements. In embodiments, fabrication of the composite web can be performed by Automated Fiber Placement (AFP). Any other suitable fiber placement is contemplated, such as such as filament-winding or fiber braiding.

Certain embodiments (e.g., FIG. 20) of the method of manufacture can include using a washable temporary mandrel, where the outside surface of the mandrel correspond to the inside surface of the composite web. The web can be applied on the top of the outside surface of the mandrel, and upon completion of the web fabrication, the mandrel is removed by washing it out.

In embodiments (e.g., FIG. 21), the washable mandrel of a complex shape can also include an insert in form of metallic cylindrical element providing additional strength and stiffness during fabrication. This metallic cylindrical element can also be repeatedly used for fabrication of multiple shafts with benefits of manufacturing cost reduction due to smaller volume of washable material.

In certain embodiments, (e.g., FIGS. 22-23) the entire mandrel system consists of a metallic cylinder and plurality of washable ring-type temporary mandrels separately for individual undulations. Another embodiment, (e.g., FIGS. 24 and 25) a solid insert can be used as a ring-type mandrel instead of washable material. Such mandrels can be implemented as a combination of separate segments joined together to create a ring-type part (FIG. 25). The segments can be assembled by joints to create a ring-type mandrel before fabrication of the composite web. The segmented rings can be re-assembled and removed after the web fabrication. The re-assembling process can be performed through gaps between spiral elements. Different variants of temporary joining solutions between the segments can be used depending on materials, number of segments, cost restrictions, etc. A representative example of joining solution can be a bolting connection making both assembling and re-assembling fast and simple. Any combination of methods of manufacture described herein can be suitable for any one or more of the drive shafts described herein. Moreover, any one or more elements of the embodiments of the drive shafts included can be combined with other embodiments of drive shafts and methods of manufacture as needed to achieve desired properties of the drive shaft.

Applications of fiber-reinforced polymer-matrix composite materials for drive shaft bodies can provide significant advantages with respect to the overall weight vs. more traditional fully metallic shafts. Additional benefits associated with composite drive shafts are opportunities for material design optimization, i.e., by placing high-strength fibers, for example, carbon, glass or organic (e.g., Kevlar) fibers, in orientations of maximal structural impact. Therefore, fully integrated composite coupling and shaft body systems can be highly efficient load bearing structures for aircraft applications.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

What is claimed is:

1. A composite shaft, comprising:
   a plurality of composite elements arranged about an axis to form a hollow shaft,
      wherein the plurality of composite elements incudes:
      a first group of the composite elements arranged about the axis offset by an angle +a;
      a second group of the composite elements arranged about the axis offset by an angle −a to form a web with the first group of composite elements, wherein the first and second groups of the plurality of composite elements are configured to cooperate to allow the hollow shaft to be flexible under bending and/or axial load and stiff under rotational load; and a third group of composite elements arranged generally circumferentially about the axis and axially spaced apart from one another along the axis, and one or more undulations extending radially outward from the shaft;

wherein the third plurality of individual composite elements are positioned between the one or more undulating portions.

2. The composite shaft of claim 1, wherein the undulations include a plurality of axisymmetric ring-like undulations distributed along a length of the shaft.

3. The composite shaft of claim 1, wherein the plurality of composite elements includes a plurality of individual composite elements oriented along respective axes of the individual composite elements, wherein the individual composite elements include unidirectionally oriented fibers in a polymeric matrix to form a fiber-reinforced polymer-matrix composite.

4. The composite shaft of claim 1, wherein the first group of composite elements includes a first plurality of individual composite elements arranged in a first spiral direction along the axis of the shaft, and wherein the second group of composite elements includes a second plurality of individual composite elements arranged in a second spiral direction along the axis of the shaft, wherein the second spiral direction is symmetric to the first spiral direction relative to the shaft axis.

5. The composite shaft of claim 4, wherein a plurality of plies of the first plurality of individual composite elements are interleaved with a plurality of plies of the second plurality of individual composite elements.

6. The composite shaft of claim 4, wherein each individual composite element of the first plurality of individual composite elements are circumferentially spaced from one another about the axis, and wherein each individual composite element the second plurality of individual composite elements are circumferentially spaced from one another about the axis such that a gap is formed between each individual composite element of the first plurality of individual composite elements and a gap is formed between each individual composite element of the second plurality of individual composite elements.

7. The composite shaft of claim 6, wherein the plurality of composite elements has a constant density along the shaft in an axial direction such that a respective gap formed between each individual composite element of the first plurality of individual composite elements and between each individual composite element of the second plurality of individual composite elements has a constant size along the axial length of the shaft.

8. The composite shaft of claim 4, wherein a plurality of plies of the first plurality of individual composite elements are overlaid on top of a plurality of plies of the second plurality of individual composite elements.

9. The composite shaft of claim 1, wherein the plurality of composite elements further includes a fourth group of composite elements arranged axially along the axis and circumferentially spaced apart from one another about the axis.

10. The composite shaft of claim 1, wherein a density of the plurality of composite elements is greater on a portion of the shaft between the undulating portions than a density of composite elements on the one or more undulating portions of the shaft.

11. The composite shaft of claim 1, wherein an axial cross-sectional profile of the hollow shaft is constant along an axial length of the shaft, or wherein an axial cross-sectional profile of the hollow shaft is convex along an axial length of the hollow shaft, or an axial cross-sectional profile of the hollow shaft is concave along an axial length of the hollow shaft.

12. A method of making a composite shaft, comprising, forming a mandrel to have one or more undulating portions along an axis of the mandrel;

overlaying a first group of composite elements arranged about the axis offset by an angle $+\alpha$, a second group of composite elements arranged about the axis offset by an angle $-\alpha$, and a third group of composite elements as axially spaced hoops around an external surface of the mandrel to form a composite web with the first and second groups of composite elements, wherein the third group of composite elements are positioned between the one or more undulating portions;

hardening the composite web on the mandrel; and removing the mandrel from within the composite web to form a hollow shaft;

wherein the first and second groups of the plurality of composite elements are configured to cooperate to allow the hollow shaft to be flexible under bending and/or axial load and stiff under rotational load.

13. The method of claim 12, wherein forming the mandrel includes forming a washable material to have one or more undulating portions along the axis of the mandrel, and wherein removing the mandrel includes applying a fluid to the washable mandrel to dissolve the washable mandrel to form the hollow shaft.

14. The method of claim 12, wherein forming the mandrel includes forming a washable material to have one or more undulating portions along the axis of the mandrel over a metallic cylindrical sub-mandrel, and wherein removing the mandrel, includes removing the metallic cylindrical sub-mandrel from the washable material, and applying a fluid to the washable mandrel to dissolve the washable mandrel to form the hollow shaft.

15. The method of claim 12, wherein forming the mandrel includes installing a plurality of washable rings to a metallic cylindrical sub-mandrel to form the one or more undulating portions along the axis of the mandrel, and wherein removing the mandrel includes removing the metallic cylindrical sub-mandrel from the washable rings, and applying a fluid to the washable rings to dissolve the washable rings to form the hollow shaft.

16. The method of claim 12, wherein forming the mandrel includes installing a plurality of circumferentially segmented rings, to a metallic cylindrical sub-mandrel to form the one or more undulating portions along the axis of the mandrel, and wherein removing the mandrel includes removing the metallic cylindrical sub-mandrel from the segmented rings, and disassembling the segmented rings to form the hollow shaft.

17. The method of claim 12, wherein overlaying the first and second groups of composite elements includes placing a first plurality of individual composite elements in a first spiral orientation along the axis of the mandrel in a first direction, and placing a second plurality of individual composite elements in a second spiral orientation along the axis of the mandrel in a second direction symmetrically-opposite from the first direction using automated fiber placement.

18. The method of claim 17, wherein placing the first plurality of individual composite elements and placing the second plurality of individual composite elements comprises interleaving a plurality of plies of the first plurality of individual composite elements with a plurality of plies of the second plurality of individual composite elements.

19. The method of claim 17, wherein first plurality of individual composite elements and the second plurality of individual composite elements include a polymeric matrix or a fiber-reinforced polymer-matrix, wherein hardening includes solidifying or curing based on a composition of the first and second plurality of composite elements.

* * * * *